United States Patent
Boyapalle et al.

(10) Patent No.: US 10,049,009 B2
(45) Date of Patent: Aug. 14, 2018

(54) REMEDIATION OF A DEVICE USING AN EMBEDDED SERVER

(71) Applicant: Dell Products, L.P., Round Rock, TX (US)

(72) Inventors: Anantha Boyapalle, Cedar Park, TX (US); Yuan-Chang Lo, Austin, TX (US); Marc Hammons, Round Rock, TX (US); Philip Seibert, Austin, TX (US); Todd Swierk, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 87 days.

(21) Appl. No.: 15/163,362

(22) Filed: May 24, 2016

(65) Prior Publication Data

US 2017/0344429 A1     Nov. 30, 2017

(51) Int. Cl.
| | |
|---|---|
| *G06F 11/00* | (2006.01) |
| *G06F 11/14* | (2006.01) |
| *G06F 11/07* | (2006.01) |
| *H04W 76/14* | (2018.01) |

(52) U.S. Cl.
CPC ...... *G06F 11/1417* (2013.01); *G06F 11/0709* (2013.01); *G06F 11/079* (2013.01); *G06F 11/0751* (2013.01); *G06F 11/0784* (2013.01); *G06F 11/0793* (2013.01); *H04W 76/14* (2018.02)

(58) Field of Classification Search
CPC ............ G06F 11/0709; G06F 11/079; G06F 11/0793; G06F 11/00; G06F 11/0751; G06F 11/0787; G06F 11/1417; G06F 11/2294

See application file for complete search history.

(56) References Cited

U.S. PATENT DOCUMENTS

| | | | | |
|---|---|---|---|---|
| 7,366,888 B2 * | 4/2008 | Dayan | ............... | G06F 9/4406 713/2 |
| 8,713,350 B2 * | 4/2014 | Walton | ............... | G06F 11/0712 714/1 |
| 8,839,032 B2 * | 9/2014 | Walton | ............... | G06F 11/0712 709/224 |
| 9,529,602 B1 * | 12/2016 | Swierk | ............... | G06F 9/441 |
| 2002/0188837 A1 * | 12/2002 | Dayan | ............... | G06F 9/4406 713/1 |

(Continued)

*Primary Examiner* — Charles Ehne
(74) *Attorney, Agent, or Firm* — Fogarty LLP

(57) ABSTRACT

Methods, systems and devices for remediation of a malfunctioning IHS (Information Handling Systems) using a peer IHS. Upon detecting a failure condition that prevents booting a primary operating system, the malfunctioning IHS initiates a remediation service as a BIOS/UEFI runtime process. The remediation service specifies remediation resources via an embedded web server. The web server provides a web interface that provides a peer IHS with resource links that provide access to remediation resources stored on the malfunctioning IHS. The web interface may also provide links that trigger the transfer of diagnostic information from the malfunctioning IHS to the peer IHS, which can be further relayed to a remote diagnostic service that may provide the peer IHS with updated remediation resources. The remediation resource may utilize pre-boot diagnostic processes to identify resources that are targeted to specific failures detected on the malfunctioning IHS.

14 Claims, 4 Drawing Sheets

(56) References Cited

U.S. PATENT DOCUMENTS

2011/0264776 A1* 10/2011 Clerc .................... G06F 8/63
709/222
2014/0230078 A1* 8/2014 Graham ............... G06F 21/572
726/30
2014/0372583 A1* 12/2014 Tseng .................... H04L 67/34
709/223

* cited by examiner

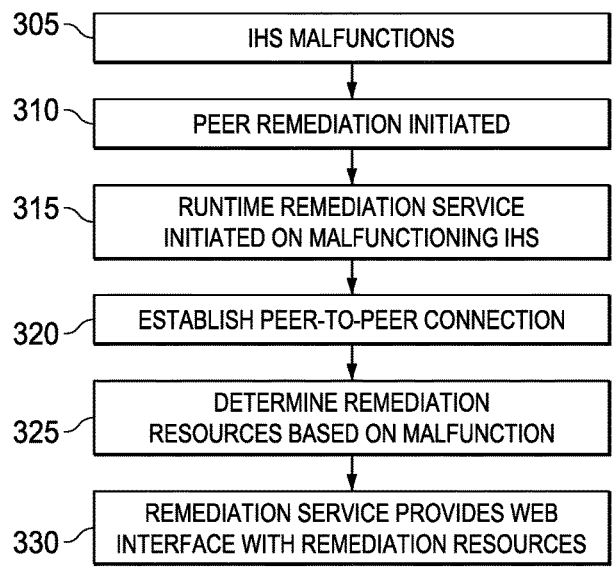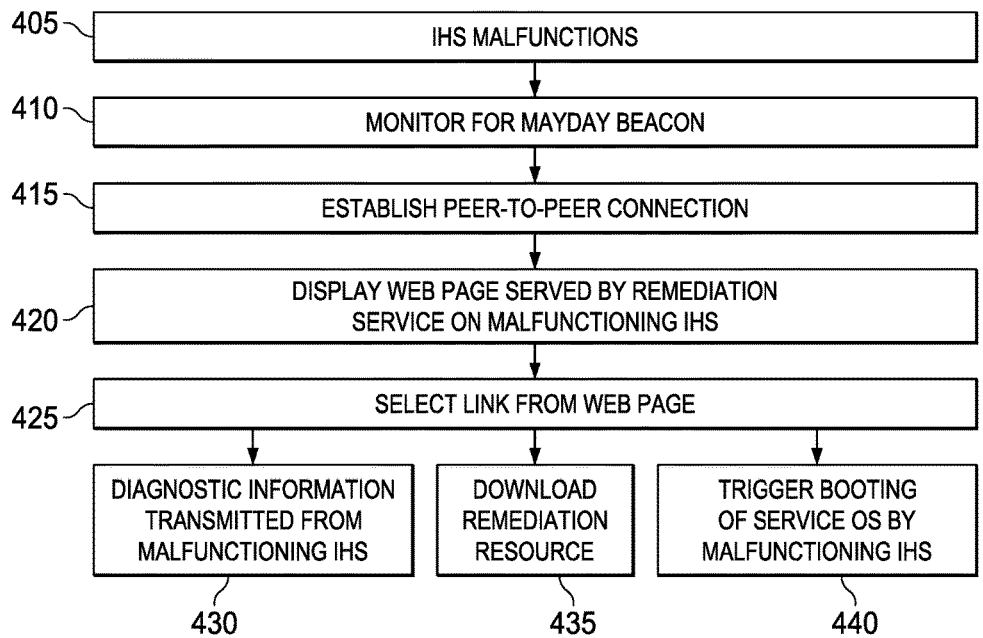

REMEDIATION OF A DEVICE USING AN EMBEDDED SERVER

FIELD

This disclosure relates generally to remediation of malfunctioning Information Handling Systems (IHSs), and more specifically, to remediation of malfunctioning IHSs using an embedded server.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

As the size of networks comprised of IHSs increases, the burden of administering the devices that comprise the network of IHSs also increases. In general, a significant portion of these administrative services are currently provided remotely. In situations where remote administration is not possible, potentially as a result of an IHS malfunction, the remote administrative services that would otherwise be relied on by a user are not available. In such situations, remediation of a malfunctioning IHS may require manual administration of the malfunctioning IHS. Manual administration may delay remediation due to the relative inefficiency of this process, especially if provided via telephone.

In addition to preventing remote administration, the nature of an IHS malfunction may also limit the functionality of the malfunctioning IHS. For instance, a hard drive failure may prevent an IHS from accessing an operating system and thus prevent the IHS from booting. Such a failure effectively disables most IHSs, especially IHSs owned and managed by retail consumers. However, certain aspects of the IHS may still remain functional. For instance, certain networking interfaces that may be used to establish a peer-to-peer connection with a nearby IHS.

SUMMARY

Embodiments described herein provide methods, systems and devices for remediation of a malfunctioning IHS (Information Handling System) using a peer IHS. Upon detecting a failure condition that prevents booting a primary operating system, the malfunctioning IHS according to various embodiments initiates a remediation service as a BIOS/UEFI runtime process. The remediation service specifies remediation resources via an embedded web server. The embedded web server provides a web interface that provides a peer IHS with resource links that provide access to remediation resources stored on the malfunctioning IHS. The web interface may also provide links that trigger the transfer of diagnostic information from the malfunctioning IHS to the peer IHS, which can be further relayed to a remote diagnostic service that may be configured to provide the peer IHS with updated remediation resources. The remediation resource may utilize pre-boot diagnostic processes to identify resources that are targeted to specific failures detected on the malfunctioning IHS.

According to various embodiments, a method for remediation by an malfunctioning IHS includes detecting an error condition in the malfunctioning IHS, wherein the error condition prevents the malfunctioning IHS from booting a primary operating system; establishing a peer-to-peer wireless connection with a peer IHS in response to the detection of the error condition; starting a remediation service, wherein the remediation service is started as a runtime service of the malfunctioning IHS; and providing a web interface via the remediation service, wherein the web interface specifies remediation resources for repairing the error condition.

According to various additional embodiments, the remediation interface is a web interface that provides links to one or more remediation resources. According to various additional embodiments, the remediation resources provided by the web interface are selected by the remediation service based on the detected error condition. According to various additional embodiments, the web interface includes a link that triggers the transmission of diagnostic information to the peer IHS by the malfunctioning IHS. According to various additional embodiments, the diagnostic information is transmitted by the remediation service to the peer IHS via the peer-to-peer wireless connection. According to various additional embodiments, the web interface includes a link that triggers the download of a remediation resource from a remote repository to the peer IHS. According to various additional embodiments, a first remediation resource of the one or more remediation resource is stored on the malfunctioning IHS. According to various additional embodiments, the remediation service is a BIOS (Basic I/O System)/UEFI (Unified Extensible Firmware Interface) runtime service and wherein the remediation service is started via instructions stored in a non-volatile memory of the BIOS/UEFI of the malfunctioning IHS. According to various additional embodiments, the web interface includes a link that triggers the malfunctioning IHS to boot a service operating system. According to various additional embodiments, the method further includes booting the service operating system by the malfunctioning IHS, wherein the booted service operating system provides a remediation interface on the peer IHS. According to various additional embodiments, the remediation interface displays the web interface provide by the remediation service of the malfunctioning IHS. According to various additional embodiments, the method further includes initiating a pre-boot diagnostic process; and selecting the remediation resources provided by the web interface based on error condition information provided by the pre-boot diagnostic process.

According to various embodiments, a method for remediation by an malfunctioning IHS by a peer IHS includes monitoring for a peer-to-peer wireless signal broadcast indicating a failure condition in the malfunctioning IHS, wherein the error condition prevents the malfunctioning IHS from booting a primary operating system; responding to the wireless broadcast signal issued by the malfunctioning IHS; establishing a peer-to-peer wireless connection with a remediation service running on the malfunctioning IHS; and retrieving remediation information from the remediation service via the peer-to-peer wireless connection.

According to various additional embodiments, the remediation information provided by the remediation service is a remediation webpage that provides links to one or more remediation resources. According to various additional embodiments, the method further includes providing a remediation interface on the peer IHS, wherein the remediation interface displays the remediation webpage on the peer IHS. According to various additional embodiments, the selection of one or more of the links triggers the transmission of diagnostic information from the malfunctioning IHS to the peer IHS via the peer-to-peer wireless connection. According to various additional embodiments, the method further includes transmitting the diagnostic information to a remote diagnostic service. According to various additional embodiments, the selection of one or more of the links triggers the download of a remediation resource from a remote repository to the peer IHS. According to various additional embodiments, the selection of one or more of the links triggers the malfunctioning IHS to boot a service operating system. According to various additional embodiments, the method further includes providing a remediation interface on the peer IHS, wherein the remediation interface display the remediation webpage on remote administrative interface configured to provide access to the peer IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 3 is a flowchart illustrating certain steps of a process according to various embodiments by which a malfunctioning IHS may provide a web interface for providing access to remediation resources for use by a peer IHS.

FIG. 4 is a flowchart illustrating certain steps of another process according to various embodiments by which a malfunctioning IHS may provide a web interface for providing peer remediation capabilities to a peer IHS.

DETAILED DESCRIPTION

Figure 1:
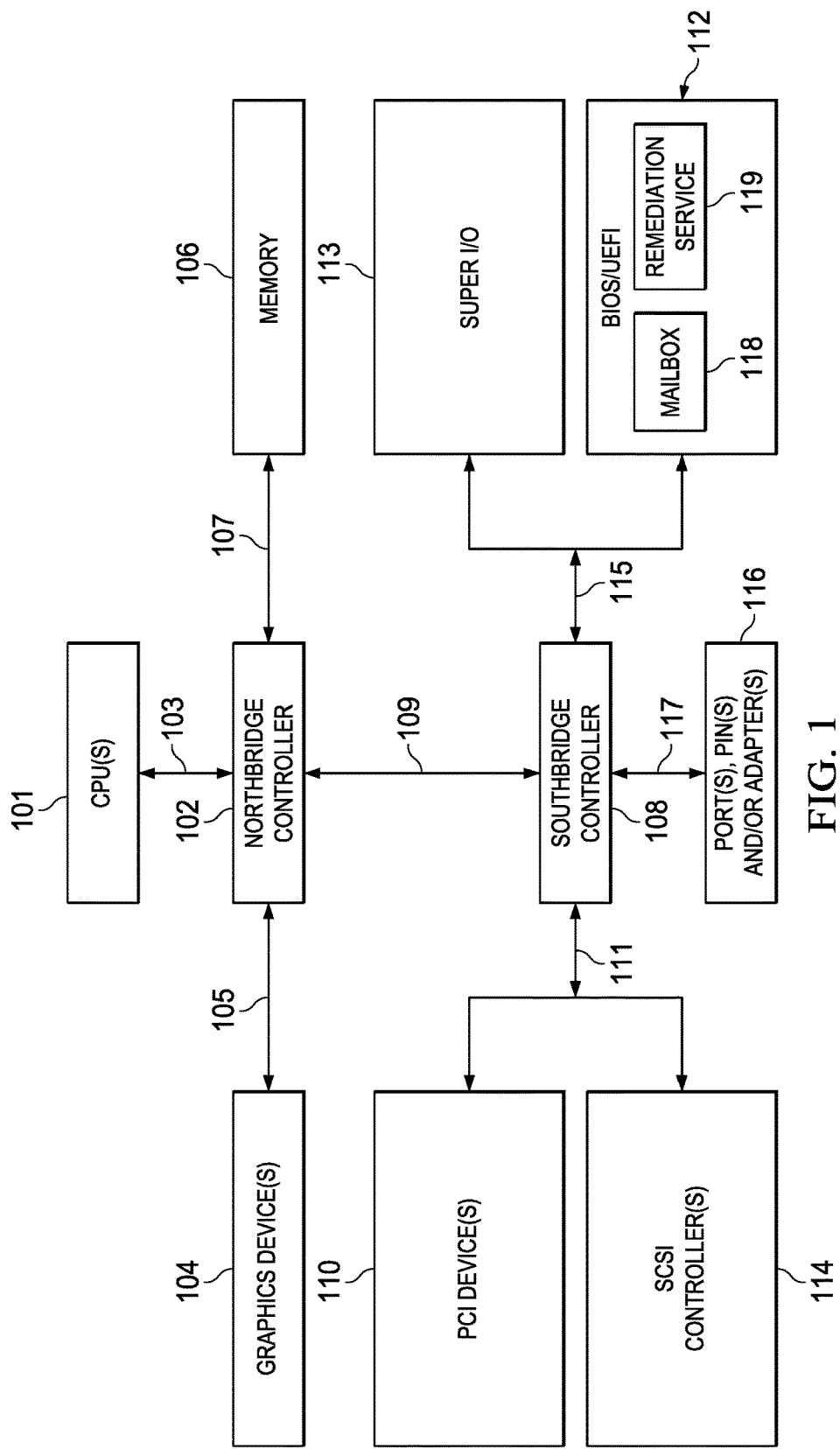
FIG. 1 is a block diagram illustrating certain components of an IHS.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal desktop or laptop computer, a mobile phone, a tablet, a 2-in1 laptop/tablet, a server computer, a consumer electronic device, a gaming console, a printer, an automobile information system, a network storage device, a network router, a network video camera, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a magnetic hard drive, an optical drive, a solid-state drive), a sequential access storage device (e.g., a tape drive), compact disk, CD-ROM, DVD, random access memory (RAM), read-only memory (ROM), electrically erasable programmable read-only memory (EEPROM), and/ or flash memory. Computer-readable media may also include optically readable barcodes (one or two-dimensional), plastic cards with embedded magnetic strips, mechanically or optically read punched cards, or radio frequency identification tags.

An IHS may experience a wide range of possible error conditions that result in a malfunction. Such malfunctions may require remediation in order to correct the error conditions such that user of the IHS can resume normal operations, or at least continue the remediation process in another fashion. In certain scenarios, a malfunctioning IHS may be unable to boot its primary operating system (primary OS), thus rending the IHS unusable. In certain other scenarios, a malfunctioning IHS may be able to boot its primary operating system, but remediation is still required due to error conditions that serve to partially disable the IHS such that it is effectively unusable. In certain scenarios, a malfunctioning IHS may be able to load a secondary operating system or a "safe mode" variant of its primary operating system. In such scenarios, remediation may still be required in order to enable the malfunctioning IHS to boot its primary operating system.

The error conditions that contribute to the IHS malfunction may preclude certain remediation procedures and may complicate identification of the malfunctioning IHS. For instance, an error condition may prevent the malfunctioning IHS from certain error notification procedures. In one scenario, a failure to boot the primary operating system by a malfunctioning IHS may result in the complete loss of remote administrative capabilities. In other scenarios, an IHS may be able to load its primary OS, but remote administrative tools may nonetheless be rendered ineffective due to error conditions in the IHS. Depending on the error condition, remote administrative tools may be of little use such that remediation of the IHS malfunction may require manual identification, diagnosis and repair of the error condition.

Once the malfunctioning IHS has been identified, the nature of the malfunction may also prevent efficient transfer of remediation resources to the malfunctioning IHS using remote administration tools. In scenarios where remote administrative tools have been rendered ineffective, remediation of the malfunctioning IHS may require physically locating and administering the malfunctioning IHS. In systems comprised of large numbers of IHSs, such as an enterprise data center comprised of multiple racks filled with almost identical servers, such manual administrative procedures are burdensome.

Various embodiments provide remediation of a malfunctioning IHS via a peer IHS that is functioning properly. In certain scenarios, the nature of an IHS malfunction may allow remediation procedures through a peer IHS where remote administrative tools are not capable of addressing the malfunction. In certain such scenarios, limited communication abilities available by the malfunctioning IHS may be utilized to establish a peer-to-peer connection to a peer IHS that is located in relatively close proximity to the malfunctioning IHS. By utilizing peer remediation, the malfunctioning IHS may be at least partially remediated such that remote administration tools can be utilized. The use of peer remediation may also allow a standard suite of remediation procedures to be attempted without requiring involvement by a human administrator, thus providing an opportunity to potentially remediate the malfunctioning IHS without the delays attendant with a human administrator identifying, diagnosing and repairing the error condition.

FIG. 1 is a block diagram of certain components of an IHS, as described with respect to a malfunctioning IHS and a peer IHS, according to various embodiments. As illustrated, an IHS may include one or more CPUs 101. In various embodiments, an IHS may be a single-processor system including one CPU 101, or a multi-processor system including two or more CPUs 101 (e.g., two, four, eight, or any other suitable number). CPU(s) 101 may include any processor capable of executing program instructions. For example, in various embodiments, CPU(s) 101 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 101 may commonly, but not necessarily, implement the same ISA.

In certain embodiments, CPU(s) 101 are coupled to northbridge controller or chipset 101 via front-side bus 103. Northbridge controller 102 may be configured to coordinate I/O traffic between CPU(s) 101 and other components. For example, in the illustrated embodiment, northbridge controller 102 is coupled to graphics device(s) 104 (e.g., one or more video cards or adaptors) via graphics bus 105 (e.g., an Accelerated Graphics Port or AGP bus, a Peripheral Component Interconnect or PCI bus, or the like). Northbridge controller 102 may also be coupled to system memory 106 via memory bus 107. According to various embodiments, memory 106 may be configured to store program instructions, such as peer remediation programs, and/or data accessible by CPU(s) 101. In various embodiments, memory 106 may be implemented using any suitable memory technology, such as static RAM (SRAM), synchronous dynamic RAM (SDRAM), nonvolatile/Flash-type memory, or any other type of memory.

Northbridge controller 102 may be coupled to southbridge controller or chipset 108 via internal bus 109. Southbridge controller 108 may be configured to handle various I/O capabilities supported by an IHS, and it may provide interfaces such as, for instance, Universal Serial Bus (USB), audio, serial, parallel, Ethernet, or the like via port(s), pin(s), and/or adapter(s) 116 over bus 117. For example, southbridge controller 108 may be configured to allow peer-to-peer connections between two IHSs, such as a malfunctioning IHS and a peer IHS. In various embodiments, southbridge controller 108 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. As described, the I/O capabilities of an IHS may be utilized to interface via a peer-to-peer wireless communication protocol, such as Wi-Fi Direct, with a peer IHS in the operation of a peer remediation service.

Southbridge controller 108 may also enable connection to one or more keyboards, keypads, touch screens, scanning devices, voice or optical recognition devices, or any other devices suitable for entering or retrieving data. Multiple I/O devices may be present in an IHS. In some embodiments, I/O devices may be separate from an IHS and may interact with an IHS through a wired or wireless connection. As shown, southbridge controller 108, may be further coupled to one or more PCI devices 110 (e.g., modems, network cards, sound cards, or video cards) and to one or more SCSI controllers 114 via parallel bus 111. Southbridge controller 108 may also be coupled to Basic I/O System (BIOS)/UEFI 112 and to Super I/O Controller 113 via Low Pin Count (LPC) bus 115. Super I/O Controller 113 may combine interfaces for a variety of lower bandwidth or low data rate devices. Those devices may include, for example, floppy disks, parallel ports, keyboard and mouse, environmental sensors and fan speed monitoring/control, among others.

BIOS/UEFI 112 may include non-volatile memory having program instructions stored thereon. Those instructions may be usable CPU(s) 101 to initialize and test other hardware components and/or to load an Operating System (OS) for operation of an IHS. The BIOS/UEFI 112 initializes and tests the hardware components of an IHS, executes any pre-boot processes, such as Dell ePSA diagnostic processes in certain embodiments, and loads a boot loader or an OS from a memory device. The BIOS/UEFI 112 provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term BIOS, as used herein, is intended also encompass UEFI firmware and future variations thereof.

In certain embodiments, BIOS/UEFI 112 may have access to a predefined region of storage that may be used to store instructions or data. As illustrated in FIG. 1, in certain embodiments, a predefined storage available to the BIOS/UEFI may be referred to as a "mailbox" 118 of the BIOS/UEFI, where this mailbox may be configured to receive data and/or instructions in the form of mailbox "messages". As described below, the BIOS/UEFI mailbox 118 may be used in certain embodiments to store peer remediation instructions and remediation resources. For instance, in certain embodiments, BIOS/UEFI 112 may utilize the mailbox 118 to store instructions and/or data for a runtime remediation service 119 that may be started upon detection of an IHS malfunction, such as failure to boot the primary OS. The remediation service 119 may be utilized to provide a remediation interface by which a peer IHS can be used to access the remediation resources in order remediate a malfunctioning IHS.

Figure 2:
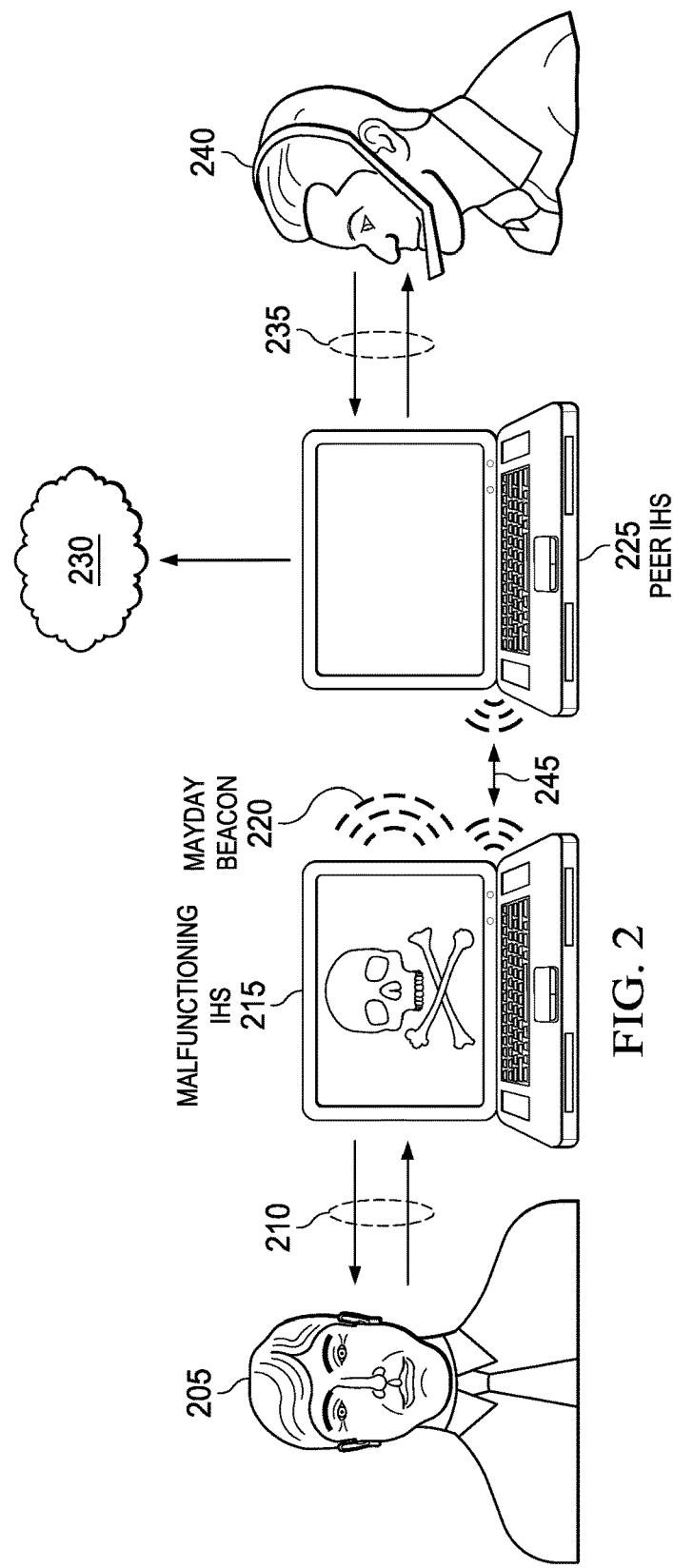
FIG. 2 is a diagram illustrating an example of an environment where systems and methods for providing remediation services via a peer IHS may be implemented according to various embodiments.

FIG. 2 illustrates a system according to various embodiments that is configured to provide remediation of a malfunctioning IHS 215 via a peer IHS 225 that is in relatively close proximity. In certain scenarios, the malfunctioning IHS 215 may be effectively disabled such that user 205 has no means for input or output 210. In certain other scenarios, the malfunctioning IHS 215 may be partially disabled such that certain input and/or output 210 functions are available. In certain embodiments, the malfunctioning IHS 215 may be configured to utilize any available input and/or output 210 capabilities to prompt the user 210 to initialize a peer remediation process. In certain embodiments, the malfunctioning IHS 215 may be configured to automatically initiate a peer remediation process as soon as certain error conditions are detected. For instance, certain embodiments may be configured to initiate peer remediation for an IHS upon detecting repeated failed attempts to boot the main operating system of an IHS. In addition to or instead of failed boot attempts, certain embodiments may utilize additional error conditions and/or fault codes to trigger peer remediation.

Once peer remediation has been initiated, the malfunctioning IHS 215 may begin attempts to identify and connect to a peer IHS that is configured to provide peer remediation. In certain embodiments, the malfunctioning IHS 215 may broadcast its status via a mayday beacon 220. In certain embodiments, the mayday beacon 220 is broadcast by a malfunctioning IHS 215 via a peer-to-peer wireless signal, such as a Wi-Fi or Bluetooth signal. In certain of such embodiments that utilize Wi-Fi signaling, the mayday beacon may broadcast a Wi-Fi SSID that serves to signal that the malfunctioning IHS 215 is searching for a peer IHS that can provide peer remediation. In certain embodiments, the Wi-Fi SSID is a Wi-Fi Direct access point broadcast that identifies the malfunctioning IHS 215 as configured to connect to a peer IHS via a peer-to-peer Wi-Fi Direct connection.

According to various embodiments, the peer IHS 225 may be configured to scan for mayday beacon broadcasts. In certain embodiments, the peer IHS 225 may be configured to periodically scan for mayday beacon broadcasts. In certain embodiments, the peer IHS 225 may be configured to begin scanning for mayday beacon broadcasts based on a command issued via a remote administration tool or diagnostic service. The command may be issued to the peer IHS 225 based on input 235 provided by a human administrator 240. The command may also or instead be issued automatically by a diagnostic service upon detecting an error condition or extended offline status by the malfunctioning IHS 215, thus indicating the need for remediation. In certain embodiments, the peer IHS 225 is configured to scan for Wi-Fi SSIDs that have been specified as indicating a request for peer remediation.

Upon detection of a mayday beacon, the peer IHS 225 may be configured to respond by initiating a peer-to-peer wireless connection 245, such as a Wi-Fi Direct connection, with the malfunctioning IHS 215. The wireless connection may be initiated upon authentication of the malfunctioning IHS 215 and peer IHS 225. Once the peer-to-peer wireless connection 245 is established, the peer IHS 225 and the malfunctioning IHS 215 may exchange remediation information via the wireless connection 245. In certain embodiments, the remediation information may be a web interface generated by a web server running on the malfunctioning IHS 215, where the web interface provides a peer IHS with access to various remediation resources stored on the malfunctioning IHS 215. In certain embodiments, the peer IHS 225 may further utilize the web interface provided via the peer-to-peer wireless connection 245 to obtain diagnostic information describing the platform of the malfunctioning IHS 215 and/or specific error conditions and logs reported by the malfunctioning IHS 215. Such information may then be used by a diagnostic service that is configured to analyze the diagnostic information and to provide updated remediation resource for use in remediating the malfunctioning IHS 215.

In certain embodiments, the remote diagnostic service is accessible to IHSs as a cloud service 230 that is configured to provide support for peer remediation. In certain embodiments, the remote diagnostic service is configured to analyze the provided diagnostic information in order to determine the remediation resources that are most likely to remediate the malfunctioning IHS. For instance, the diagnostic service may be configured to process logs provided by the malfunctioning IHS. Based on this processing, the diagnostic service may identify remediation resources that are targeted at the specific error conditions reported in the logs. In certain embodiments, the analysis conducted by the diagnostic service may determine that a hardware failure in the malfunctioning IHS requires replacing the failed hardware in order to remediate the malfunctioning IHS. The diagnostic service may be further configured to source the hardware needed by the malfunctioning IHS. In certain embodiments, the analysis conducted by the diagnostic service may determine that one or more upgrades to the software of the malfunctioning IHS are necessary in order to remediate the IHS. The diagnostic service may be configured to locate the needed software upgrades and provide them to the peer IHS for installation by the malfunctioning IHS.

In certain embodiments, the diagnostic service may be configured to analyze diagnostic information provided by multiple participating peer IHSs. In such embodiments, the diagnostic service may be configured to analyze the aggregate diagnostic information from multiple participating IHSs in order to identify patterns and trends. For instance, a diagnostic service may be configured to recognize that error conditions reported by multiple malfunctioning IHSs indicate that the failures are a result of a common software upgrade by each of the malfunctioning IHSs. In such scenarios, the diagnostic service may be further configured to provide remediation resources that cause the malfunctioning IHS to roll back the identified upgrade. In certain embodiments, the diagnostic service may be further configured to identify cascading error conditions that have caused failures in peer IHSs responding to peer remediation requests. In such scenarios, the diagnostic service may be further configured to signal peer IHSs to abandon peer remediation.

FIG. 3 is a flowchart illustrating certain steps of a process according to various embodiments by which a malfunctioning IHS may provide a web interface that identifies remediation resources that can be used from a peer IHS to remediate the malfunctioning IHS. In certain embodiments, the remediation resources are preemptively stored by the malfunctioning IHS and are made available to the peer IHS via links provided by the web interface. The peer remediation procedure in the embodiment of FIG. 3 begins at step 305 upon the malfunctioning IHS experiencing an error condition that triggers the peer remediation process. As described above, the peer remediation process may be triggered at step 310 according to various embodiments based on successive boot failures, commands issued by the user of the malfunctioning IHS via any available functionality of the IHS (e.g., pre-boot keystroke commands), commands issued via a remote administrative resource and/or the detection of certain error conditions.

Once the peer remediation process has been initiated, at step 315, the malfunctioning IHS is configured according to various embodiments to initiate a runtime remediation service. Since the error condition may have prevented the malfunctioning IHS from booting its main OS, the remediation service may be initiated as a BIOS/UEFI runtime process. As a BIOS/UEFI runtime process, the remediation service can provide the malfunctioning IHS with peer remediation capabilities even if the main OS has failed to boot. In certain embodiments, the instructions necessary to run the remediation service are stored in the NVRAM of the malfunctioning IHS's BIOS/UEFI. For instance, certain embodiments may utilize a mailbox NVRAM storage that is accessible by the BIOS/UEFI of the malfunctioning IHS. Certain embodiments may utilize other NVRAM of the malfunctioning IHS in addition to or instead of a mailbox storage in order to store remediation instructions. As described with respect to FIG. 1, certain embodiments may utilize UEFI to initialize the runtime remediation service in place of or in addition to the BIOS of the malfunctioning IHS. In certain embodiments, the runtime remediation service may be initialized prior to initiating the peer remediation process of step 310.

At step 320, the malfunctioning IHS initiates a peer-to-peer wireless connection with the peer IHS. Certain embodiments may utilize a peer-to-peer wireless protocol, such as Wi-Fi Direct, for establishing a connection between the malfunctioning IHS and a peer IHS. In certain embodiments the malfunctioning IHS may broadcast a wireless mayday beacon signal to locate a peer IHS that is in close proximity to the malfunctioning IHS and is configured to provide peer remediation. In certain embodiments, the mayday beacon may be a Wi-Fi SSID broadcast that utilizes an SSID that has been specified as indicating a malfunctioning IHS that seeks remediation via a peer IHS. Other embodiments may utilize other wireless broadcast capabilities, such as Bluetooth, that allow a connection to a peer IHS in relatively close proximity to the malfunctioning IHS.

In certain embodiments, at step 325, in response to a malfunction, the runtime remediation service initiated by the malfunctioning IHS may be configured to identify remediation resources that can used to remediate the malfunctioning IHS. The remediation resources may be preemptively stored within in a NVRAM or a remediation partition of the malfunctioning IHS. Upon being initialized, the remediation service may utilize any diagnostic information available to the malfunctioning IHS in order to determine the preemptively-stored remediation resources that are most likely to provide successful remediation. For instance, in certain embodiments, the remediation service running in the BIOS/UEFI of a malfunctioning IHS may rely on diagnostic information generated by a pre-boot diagnostic process. For instance, certain embodiments may utilize a Dell ePSA (Enhanced Pre-Boot System Diagnostics) pre-boot diagnostic process that is run by the BIOS/UEFI of the malfunctioning IHS. Other embodiments may utilize other diagnostic processes that can provide error condition information that may provide an indication of the cause of the malfunction. Based on available diagnostic information, the malfunctioning IHS may be configured to determine the remediation resources that should be made available to the peer IHS in order to remediate the malfunctioning IHS.

At step 330, the remediation service running on the malfunctioning IHS initiates a web server that provides a web interface that may be used by the peer IHS to access to remediation resources stored on the malfunctioning IHS. In certain embodiments, the web interface includes a web page with links that can be manually selected to initiate remediation procedures on the malfunctioning IHS, in certain cases using the preemptively stored remediation resources stored on the malfunctioning IHS. The resources provided via the links of the web interface may be selected by the remediation service running on the malfunctioning IHS based on available diagnostic information. For instance, if diagnostic information indicates a hard drive failure, the remediation service may select only resources to be provided by the links of the web interface that provide remediation resources directed to remediation of failed hard drives.

The resources provided by the remediation service web interface may provide a user of the peer IHS with access to remediation resources stored on the malfunctioning IHS. For instance, the resource links may provide access to remediation resources preemptively stored in a designated remediation partition of the hard drive of the malfunctioning IHS, or in a non-volatile memory of the malfunctioning IHS. In certain embodiments, the non-voltage memory may be a mailbox storage that is accessible by the BIOS/UEFI. In certain embodiments, the resources provided by the remediation service web interface may trigger certain actions, such as the transfer of diagnostic information and/or log information from the malfunctioning IHS to the peer IHS. In certain embodiments, the web interface may provide access to resources that initiate the booting of a service OS by the malfunctioning IHS, where the service may be stored by the peer IHS. In certain embodiments, the web interface may include links to remediation resources that are located in a remote repository.

In embodiments where selected remediation resource are preemptively stored by an IHS, the remediation resources selected for preemptive storage may be based on the platform type of the IHS. An IHS may be periodically provided with remediation resources for preemptive storage. In such scenarios, the remediation resources provided to an IHS for preemptive storage may be selected by a diagnostic service with knowledge of the physical location and platform information for the IHS. In certain embodiments, the platform information and corresponding remediation resources may be determined by the diagnostic service based on a unique identifier associated with an IHS. In certain embodiments, this unique identifier may be a Dell service tag identifier that uniquely identifies an IHS.

The remediation resources that may be preemptively stored by an IHS can be any software program, firmware, script, upgrade, patch, driver, tool and/or set of instructions that is configured to diagnose and/or repair error conditions in the IHS. For instance, the remediation resources may include diagnostic scan tools such as the SFC (System File Checker) Microsoft diagnostic tool. Other such tools may include other Microsoft utilities such as CHKDSK, ScanDisk and SMART tools. The remediation resources may include instructions and/or information for updating anti-virus definitions of the malfunctioning IHS. The remediation resources may include repair tools such as registry cleaners, Support Assist and backup tools. The remediation resources linked to by the web interface may trigger the execution of various scripts that may be configured to collect diagnostic information and report the collected information to a remote diagnostic service for processing, as described.

FIG. 4 is a flowchart illustrating certain steps of another process according to various embodiments by which a peer IHS may provide peer remediation to a malfunctioning IHS. As with the service OS process describe with respect to FIG. 3, the process of FIG. 4 begins at step 405 with the malfunction of an IHS. At step 410, a peer IHS may be configured to scan for mayday beacons broadcast by the malfunctioning IHS. In certain embodiments, a peer IHS may be configured to scan for mayday beacons at periodic intervals and/or upon receipt of a command from a remote administrative resource. At step 415, a peer-to-peer connection, such as a Wi-Fi Direct connection, is established between the malfunctioning IHS and the peer IHS. In certain scenarios, the peer IHS may be configured to utilize any provided diagnostic information regarding the malfunctioning IHS to connect with a remote service and initiate a warranty check regarding the malfunctioning IHS. In certain of such scenarios, the peer IHS may be configured to proceed with the peer remediation, if the malfunctioning IHS qualifies for this level of support.

As described, a malfunctioning IHS may be configured to initialize a remediation service that provides a web interface, such as a web page with links to remediation resources that may be selected by the remediation service based on the error conditions detected in the malfunctioning IHS. In such embodiments, the peer IHS may be configured to access the web interface provided by the remediation service via the peer-to-peer connection established between a malfunctioning IHS and a peer IHS. At step 420, a peer IHS accessing a remediation web interface provided by a malfunctioning IHS may be configure to display the web interface, either locally on the peer IHS or remotely via an administrative tool that provides access to the peer IHS. In certain embodiments, the web interface may be displayed via a remediation interface that is provided on the peer IHS by a service OS booted by the malfunctioning IHS.

At step 425, a user may select from the resources provided by the remediation web interface. Three general types of remediation resource links that may be provided by a remediation web interface are provided in the illustrated embodiment. As described above, the web interface provided by the remediation resource may provide a variety of resources for diagnosing and repairing error conditions in a malfunctioning IHS. As such, the web interface provided in other embodiments may include any combination of these types of resources illustrated in FIG. 4 and may also include various different types of resources.

At step 430, a link from the remediation web interface selected by the user triggers the malfunctioning IHS to transmit diagnostic information to the peer IHS via the peer-to-peer connection. For instance, at step 430, the malfunctioning IHS may be configured to transmit platform information, failure information and/or logs to the peer IHS. Platform information may describe hardware and/or software properties of the malfunctioning IHS. In certain embodiments, the platform information describing the malfunctioning IHS may be provided using a unique identifier associated with an IHS. This unique identifier may then be used to query a remote service for detailed platform information regarding the malfunctioning IHS. For instance, in certain embodiments, an IHS may be uniquely identified using a Dell service tag identifier that can be used to obtain detailed platform information for an IHS. Failure information provided by the malfunctioning IHS may describe error conditions or faults detected by the malfunctioning IHS. The logs may be any log maintained by the malfunctioning IHS and may itself contain platform information and/or failure information. The malfunctioning IHS may be configured to transmit diagnostic information, such as platform information and error conditions, by encoding such diagnostic information in QR codes that are transmitted to the peer IHS. The diagnostic information transmitted to the peer IHS may be further relayed to a remote diagnostic service for additional analysis, as described above. In certain embodiments, the provided diagnostic information may be displayed within the web interface, thus making the information viable to a user of the peer IHS. For instance, logs that track remediation attempts may be displayed by the web interface as a result of a user selecting a provided link. The displayed remediation history may then be used to inform manual remediation procedures.

At step 435, a link from the remediation web interface selected by the user of the peer IHS triggers remediation resources to be retrieved for use in remediating the malfunctioning IHS from the peer IHS. As described, the remediation service initialized on the malfunctioning IHS may configure the resource links provided by the web interface based on the detected error conditions in the malfunctioning IHS. As described, in certain embodiments, the links provided in the web interface may point to remediation resources preemptively stored on the malfunctioning IHS or to remediation resources located in a remote repository. In certain embodiments, rather than identify specific remediation resources, the links provided by the web interface may instead encode diagnostic information that is transmitted to a remote diagnostic service for use in determining the most appropriate remediation resources to be provided to the peer IHS. At step 435, the selection of a link results in a remediation resource being transmitted to the peer IHS from the remediation resources preemptively stored by the malfunctioning IHS or from a remote diagnostic service.

At step 440, a link from the remediation web interface selected by the user of the peer IHS triggers a service OS to be booted by the malfunctioning IHS. As described, an IHS may preemptively store remediation resources. In certain embodiments, an IHS may preemptively store a service OS that is configured for the particular hardware and/or software properties of the IHS. In certain embodiments, the peer remediation may be configured to provide the remediation service with information identifying a service OS stored on the peer IHS. The remediation service may provide a web interface that includes a link that specifies the location of a service OS provided by the peer IHS. In certain embodiments, the web interface may provide a link to the remote diagnostic service, which is configured to provide a service OS. In certain embodiments, a link to a service OS may be configured to trigger the malfunctioning IHS to mount the location of a preemptively stored service OS, change the boot order specified by the BIOS/UEFI of the malfunctioning IHS and reboot the malfunctioning IHS to the service OS.

Figure 5:
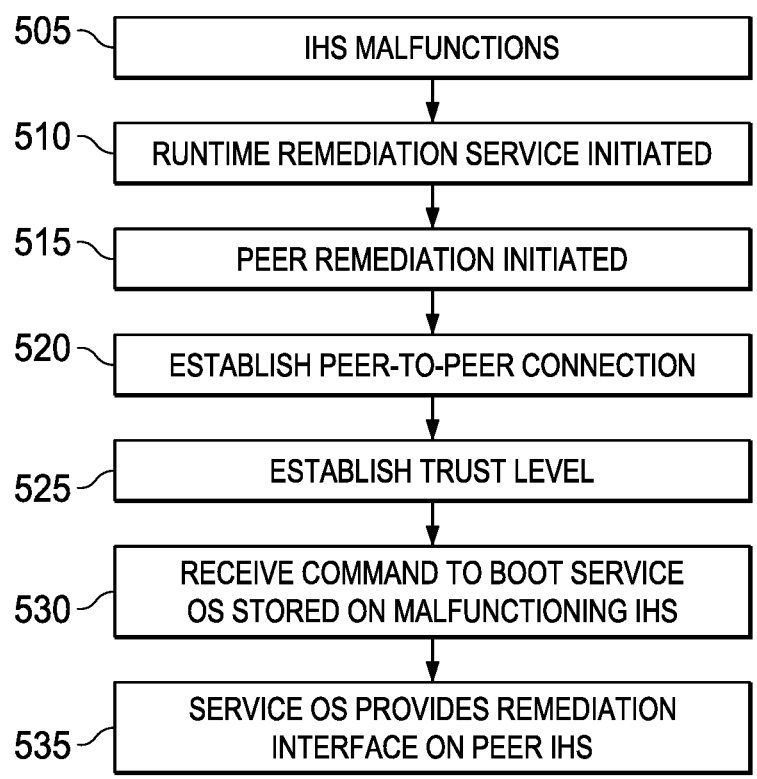
FIG. 5 is a flowchart illustrating certain steps of another process according to various embodiments by which a malfunctioning IHS may utilize peer remediation to utilize a service OS remediation resource.

FIG. 5 is a flowchart illustrating additional detail for a process according to various embodiments by which a malfunctioning IHS may access a service OS for remediation of the malfunctioning IHS. As with the process described with respect to FIG. 4, the process of FIG. 5 begins at step 505 with the malfunction of an IHS and continues at step 510 with the initialization of the runtime remediation service from the BIOS/UEFI of the malfunctioning IHS. As described above, the peer remediation process may be triggered at step 515 based on successive boot failures by the malfunctioning IHS. At step 520, a peer-to-peer connection, such as a Wi-Fi Direct connection, is established between the malfunctioning IHS and the peer IHS.

Prior to commencing with peer remediation via the remediation service, the malfunctioning IHS and peer IHS may be configured, at step 425, to establish a trust level. In certain embodiments, the malfunctioning IHS may include authentication information as part of its mayday beacon broadcast. For instance, certain embodiments may include an encrypted passcode that can be used by the peer IHS to authenticate the malfunctioning IHS before negotiating a peer-to-peer connection with the malfunctioning IHS. In certain other embodiments, the malfunctioning IHS may include a certificate that authenticates ownership of an encryption key that can be used to conduct secure communications with the malfunctioning IHS. As described, in certain embodiments a malfunctioning IHS may broadcast authentication information as an aspect of a mayday beacon. In other embodiments, authentication information may instead be exchanged as part of a handshake process that is initiated upon the peer IHS responding to the mayday beacon of the malfunctioning IHS.

In certain embodiments, the trust level between the malfunctioning IHS and a peer IHS may be pre-established as an aspect of configuring IHSs for peer remediation. For instance, IHSs may be configured to authenticate peer IHSs that are located within broadcast range of an IHS and are configured to provide peer remediation. This pre-authentication step may configure an IHS to store information that can be used to authenticate peer IHSs that may later respond to a mayday beacon that is issued upon a malfunction in the IHS. Certain embodiments may utilize roots of trust that can be relied upon as a form of authentication, such as indications that both IHSs are components of a trusted network.

In certain scenarios, the error conditions resulting in the IHS malfunction may prevent or significantly limit the malfunctioning IHS's ability to providing authentication information. In certain embodiments, the malfunctioning IHS may be configured to broadcast or otherwise provide a unique identifier that may be used to authenticate the peer-to-peer connection. In certain embodiments, the unique identifier provided by the malfunctioning IHS may be a Dell service tag identifier. In embodiments utilizing a unique identifier, the peer IHS may be configured to utilize the provided unique identifier to retrieve authentication information, such as a passcode, by which to authenticate the malfunctioning IHS. In certain embodiments, the malfunctioning IHS and peer IHS may forgo authentication and instead utilize checksums to ensure the authenticity of the provided remediation tools.

As described, an IHS may preemptively store remediation resources, such as a service OS, in a remediation partition of the hard drive, or in a non-volatile memory of the malfunctioning IHS. In other embodiments, the service OS may be stored by a peer IHS and may be retrieved by a peer IHS from a remote repository using a remote diagnostic service. With the trust level established between the peer IHS and the malfunctioning IHS, at step 430, the web interface provided by the remediation service may be utilized from the peer IHS to direct the malfunctioning IHS to boot the service OS. In certain embodiments, the web interface may include instructions by which the service OS is retrieved from the remote diagnostic service.

A service OS may be a limited-functionality operating system compared to the main OS utilized by an IHS. A service OS may include one or more program instructions or that, upon execution by an IHS, enable one or more support, diagnostics, or remediation operations to be performed independently from the main OS. The service OS may include one or more service and support applications used to implement the support, diagnostic and remediation operations. In certain embodiments, once a service OS is booted by the malfunctioning IHS, the service OS may be configured to provide, at step 535, a remediation interface that is accessible via the peer IHS. Configured in this manner, a service OS provides a remediation interface that is accessible by the peer IHS via the authenticated peer-to-peer connection. In certain embodiments, the remediation interface may include the ability to display the web interface provided by the remediation service running in a malfunctioning IHS. In certain embodiments, the service OS provides the capability to report diagnostic information pertaining to the hardware of the malfunctioning IHS. The remediation interface may include a software interface that can be accessed by diagnostic services running locally on the peer IHS or by remote diagnostic services configured to access the service OS remediation interface provided by the peer IHS. The remediation interface may also include one or graphical user interfaces or command line interfaces that may be used by an administrator that may be accessing the peer IHS directly or remotely.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for remediation of a malfunctioning IHS (Information Handling System), the method comprising:
   detecting an error condition in the malfunctioning IHS, wherein the error condition prevents the malfunctioning IHS from booting a primary operating system;
   establishing a peer-to-peer wireless connection with a peer IHS in response to the detection of the error condition;
   starting a remediation service, wherein the remediation service is started as a runtime service of the malfunctioning IHS; and
   providing a web interface via the remediation service, wherein the web interface specifies remediation resources for repairing the error condition, and wherein at least one of:
   (a) the web interface provides links to one or more remediation resources;
   (b) the web interface comprises a link that triggers the transmission of diagnostic information to the peer IHS by the malfunctioning IHS;
   (c) the web interface comprises a link that triggers the download of a remediation resource from a remote repository to the peer IHS;
   (d) the web interface comprises a link that triggers the malfunctioning IHS to boot a service operating system;
   (e) the remediation service comprises a BIOS (Basic I/O System)/UEFI (Unified Extensible Firmware Interface) runtime service, wherein the remediation service is started via instructions stored in a non-volatile memory of the BIOS/UEFI of the malfunctioning IHS; or
   (f) the remediation resources are selected by the remediation service based on the detected error condition.

2. The method of claim 1, wherein the diagnostic information is transmitted by the remediation service to the peer IHS via the peer-to-peer wireless connection.

3. The method of claim 1, wherein a first remediation resource of the one or more remediation resources is stored on the malfunctioning IHS.

4. The method of claim 1, further comprising:
   booting the service operating system by the malfunctioning IHS, wherein the booted service operating system provides a remediation interface on the peer IHS.

5. The method of claim 4, wherein the remediation interface displays the web interface provided by the remediation service of the malfunctioning IHS.

6. The method of claim 1, further comprising:
   initiating a pre-boot diagnostic process; and
   selecting the remediation resources provided by the web interface based on error condition information provided by the pre-boot diagnostic process.

7. A method for remediation of a malfunctioning IHS (Information Handling System) by a peer IHS, the method comprising:
   monitoring for a peer-to-peer wireless signal broadcast indicating a failure condition in the malfunctioning IHS, wherein the error condition prevents the malfunctioning IHS from booting a primary operating system;
   responding to the wireless broadcast signal issued by the malfunctioning IHS;
   establishing a peer-to-peer wireless connection with a remediation service running on the malfunctioning IHS; and
   retrieving remediation information from the remediation service via the peer-to-peer wireless connection, wherein the remediation information provided by the remediation service is a remediation webpage that provides links to one or more remediation resources.

8. The method of claim 7, further comprising:
   providing a remediation interface on the peer IHS, wherein the remediation interface displays the remediation webpage on the peer IHS.

9. The method of claim 7, wherein the selection of one or more of the links triggers the transmission of diagnostic information from the malfunctioning IHS to the peer IHS via the peer-to-peer wireless connection.

10. The method of claim 9, further comprising:
    transmitting the diagnostic information to a remote diagnostic service.

11. The method of claim 7, wherein the selection of one or more of the links triggers the download of a remediation resource from a remote repository to the peer IHS.

12. The method of claim 7, wherein the selection of one or more of the links triggers the malfunctioning IHS to boot a service operating system.

13. The method of claim 7, further comprising:
    providing a remediation interface on the peer IHS, wherein the remediation interface displays the remediation webpage on remote administrative interface configured to provide access to the peer IHS.

14. A method, comprising:
    detecting an error condition in the malfunctioning IHS (Information Handling System), wherein the error condition prevents the malfunctioning IHS from booting a primary operating system;
    establishing a peer-to-peer wireless connection with a peer IHS in response to the detection of the error condition;
    starting a remediation service, wherein the remediation service is started as a runtime service of the malfunctioning IHS;
    providing a web interface via the remediation service, wherein the web interface specifies remediation resources for repairing the error condition and comprises a link that triggers the malfunctioning IHS to boot a service operating system; and
    booting the service operating system by the malfunctioning IHS, wherein the booted service operating system provides a remediation interface on the peer IHS.

* * * * *